US012651548B2

(12) United States Patent
Park et al.

(10) Patent No.: US 12,651,548 B2
(45) Date of Patent: Jun. 9, 2026

(54) ELECTRONIC DEVICE FOR SCREEN DISPLAY AND OPERATING METHOD THEREOF

(71) Applicant: SAMSUNG ELECTRONICS CO., LTD., Suwon-si (KR)

(72) Inventors: Byeol Park, Suwon-si (KR); Mugong Bae, Suwon-si (KR); Daewon Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/988,324

(22) Filed: Dec. 19, 2024

(65) Prior Publication Data

US 2025/0118238 A1 Apr. 10, 2025

Related U.S. Application Data

(63) Continuation of application No. PCT/KR2023/006138, filed on May 4, 2023.

(30) Foreign Application Priority Data

Jul. 7, 2022 (KR) ........................ 10-2022-0083901

(51) Int. Cl.
*G09G 3/20* (2006.01)

(52) U.S. Cl.
CPC ....... *G09G 3/2003* (2013.01); *G09G 2310/08* (2013.01); *G09G 2320/0626* (2013.01); *G09G 2320/0666* (2013.01); *G09G 2354/00* (2013.01)

(58) Field of Classification Search
CPC ...... G09G 3/2003; G09G 3/36; G09G 3/2092; G09G 3/20; G09G 2310/08;
(Continued)

(56) References Cited

U.S. PATENT DOCUMENTS 7,280,152 B2 10/2007 Kondo
7,283,173 B2 10/2007 Kondo
(Continued)

FOREIGN PATENT DOCUMENTS

CN 101969536 A 2/2011
CN 103425698 A 12/2013
(Continued)

OTHER PUBLICATIONS

International Search Report (PCT/ISA/210) issued Aug. 25, 2023 by the International Searching Authority in International Patent Application No. PCT/KR2023/006138.
(Continued)

*Primary Examiner* — Stephen G Sherman
(74) *Attorney, Agent, or Firm* — Sughrue Mion, PLLC

(57) ABSTRACT

An electronic device includes: a display; at least one memory comprising a memory storing instructions; and at least one processor operably connected to the at least one memory and configured to execute the instructions, where, by executing the instructions, the at least one processor is configured to: obtain first pattern information including information about a state of a first user for a plurality of time intervals; identify the state of the first user for a current time interval based on the first pattern information; identify a first wavelength distribution corresponding to the state of the first user based on spectrum information stored in the at least one memory; determine a first RGB output setting of the display according to the first wavelength distribution; and generate first correction information based on a user input for screen setting correction and the first RGB output setting.

16 Claims, 6 Drawing Sheets

(58) Field of Classification Search
CPC ... G09G 2320/0626; G09G 2320/0666; G09G 2354/00; G09G 5/02; G09G 5/10
See application file for complete search history.

(56) References Cited

U.S. PATENT DOCUMENTS

| | | | | |
|---|---|---|---|---|
| 7,508,446 | B2 | 3/2009 | Kondo | |
| 9,953,615 | B2 | 4/2018 | Kwon | |
| 11,030,972 | B2 | 6/2021 | Kwon et al. | |
| 2010/0039566 | A1 | 2/2010 | Kim et al. | |
| 2015/0070337 | A1* | 3/2015 | Bell | G09G 3/2003 345/82 |
| 2015/0212575 | A1 | 7/2015 | Song et al. | |
| 2018/0137837 | A1 | 5/2018 | Peana et al. | |
| 2018/0144714 | A1* | 5/2018 | Khorasani | G09G 5/02 |
| 2018/0285463 | A1 | 10/2018 | Choi et al. | |
| 2019/0105461 | A1 | 4/2019 | Banai | |
| 2020/0013371 | A1 | 1/2020 | Yang et al. | |
| 2020/0098300 | A1 | 3/2020 | Verma et al. | |
| 2022/0039754 | A1 | 2/2022 | Ahn et al. | |

FOREIGN PATENT DOCUMENTS

| | | | |
|---|---|---|---|
| CN | 109982481 | A | 7/2019 |
| CN | 110636379 | A | 12/2019 |
| JP | 2008-92342 | A | 4/2008 |
| KR | 10-1298890 | B1 | 8/2013 |
| KR | 10-1455399 | B1 | 10/2014 |
| KR | 10-2015-0088614 | A | 8/2015 |
| KR | 10-2016-0116576 | A | 10/2016 |
| KR | 10-2017-0050878 | A | 5/2017 |
| KR | 10-2019-0036656 | A | 4/2019 |
| KR | 10-2019-0100097 | A | 8/2019 |
| KR | 10-2020-0035586 | A | 4/2020 |
| KR | 10-2021-0001870 | A | 1/2021 |
| KR | 10-2021-0044019 | A | 4/2021 |
| KR | 10-2021-0105018 | A | 8/2021 |
| KR | 10-2022-0019396 | A | 2/2022 |

OTHER PUBLICATIONS

IWritten Opinion (PCT/ISA/237) issued Aug. 25, 2023 by the International Searching Authority in International Patent Application No. PCT/KR2023/006138.

Communication dated Jul. 29, 2025 issued by European Patent Office in counterpart European Patent Application No. 23835668.7.

Office Action dated Dec. 19, 2025, issued by Ministry of intellectual Property (MOIP) in Korean Patent Application No. 10-2022-0083901.

* cited by examiner

ELECTRONIC DEVICE FOR SCREEN DISPLAY AND OPERATING METHOD THEREOF

CROSS-REFERENCE TO RELATED APPLICATION(S)

This application is a continuation of International Application No. PCT/KR2023/006138, filed on May 4, 2023, in the Korean Intellectual Property Receiving Office, which is based on and claims priority to Korean Patent Application No. 10-2022-0083901, filed on Jul. 7, 2022, in the Korean Intellectual Property Office, the disclosures of which are incorporated by reference herein in their entireties.

BACKGROUND

2. Field

Embodiments of the disclosure relate to an electronic device and operation method for screen display.

2. Description of Related Art

The blue light generated when electronic devices display a screen through the display may affect the human body's nerve cells, resultantly the user's activity/sleep cycle (e.g., affecting the secretion of melatonin, which controls the user's sleep cycle). Therefore, it is necessary to control the blue light emitted from electronic devices according to the biological rhythm, and in relation to this, various blocking films attached to displays, software that reduces blue light, and eye protection monitors are being released. Currently released display devices may provide functions to relieve user eye fatigue by controlling the screen mode to adjust, e.g., the screen brightness, or color according to cases.

The display device may analyze the user's device use history and set a screen mode with frequently used image quality, or set a screen mode with optimized image quality according to the type of content to be displayed on the display device (e.g., movies, learning, natural images), thereby alleviating eye fatigue of the user watching the display device.

SUMMARY

The scheme of changing the screen mode of the display is an indirect approach as it does not control the wavelength of light actually emitted from the display device, and does not directly affect the enhancement of the biological rhythm, such as sleep or awakening, of the user viewing the display device.

Various embodiments of the disclosure provide an electronic device and an operation method thereof, for inferring the user's context based on data, such as the user's device use history and the user's profile, and outputting a screen through an optimal spectrum combination based on the inferred context.

Also provided are an electronic device and an operation method thereof, for identifying a biological cycle for each user based on the user's biological information received from an external device (e.g., a wearable device), device sensing information, or device use history, and adaptively providing an optimal wavelength for each user.

Additional aspects will be set forth in part in the description which follows and, in part, will be apparent from the description, or may be learned by practice of the presented embodiments.

According to an aspect of the disclosure, an electronic device may include: a display; at least one memory comprising a memory storing instructions; and at least one processor operably connected to the at least one memory and configured to execute the instructions, where, by executing the instructions, the at least one processor is configured to: obtain first pattern information including information about a state of a first user for a plurality of time intervals; identify the state of the first user for a current time interval based on the first pattern information; identify a first wavelength distribution corresponding to the state of the first user based on spectrum information stored in the at least one memory; determine a first RGB output setting of the display according to the first wavelength distribution; generate first correction information based on a user input for screen setting correction and the first RGB output setting; and control the display based on the first RGB output setting and the first correction information, and where the first correction information includes information about at least one of an RGB correction value, a brightness adjustment value, or a color temperature adjustment value of the display according to the first RGB output setting.

The state of the first user may be any one of a first state of preparing to sleep, a second state of waking up from sleep, or a third state of working or studying.

The at least one processor may be further configured to: determine a first time interval and a second time interval among the plurality of time intervals corresponding to the first state and the second state, respectively, based on sleep monitoring information obtained by a sensor; determine a third time interval among the plurality of time intervals corresponding to the third state based on a type of an application executed in the electronic device; and generate pattern information about the respective states corresponding to the first time interval, the second time interval, and the third time interval.

The at least one processor may be further configured to identify an interval in which the first user is in a sleeping state based on the sleep monitoring information, and where the first time interval is a predetermined time ahead of the interval in which the first user is in the sleeping state, and the second time interval is a predetermined time after the interval in which the first user is in the sleeping state.

The at least one processor may be further configured to: obtain second pattern information including information about a state of a second user for each of the plurality of time intervals; identify the state of the second user for a current time interval based on the second pattern information; identify a second wavelength distribution corresponding to the state of the second user based on spectrum information stored in the at least one memory; determine a second RGB output setting of the display according to the second wavelength distribution; and generate second correction information for the display based on the second RGB output setting.

The at least one processor may be further configured to determine a user of the electronic device as either the first user or the second user.

The at least one processor may be further configured to: generate first color information based on the first wavelength distribution; identify a first color space corresponding to the state of the first user in the current time interval based on the first wavelength distribution and the first color information; identify at least one content with a color space in which a ratio corresponding to the first color space is a predetermined ratio or more, based on data about a plurality of contents stored in the at least one memory; and cluster the identified at least one content and control the display to display the cluster of the identified at least one content.

The at least one processor may be further configured to: identify a preferred area and a non-preferred area in the color space for the state of the first user in the current time interval; and identify the at least one content including the preferred area of a first ratio or more and the non-preferred area of a second ratio or smaller.

The electronic device may further include an image input, where the at least one processor is further configured to: obtain data about the plurality of contents through the image input; generate information about a color ratio for each of the plurality of contents based on the data about the plurality of contents; and identify the at least one content based on the information about the color ratio.

The at least one processor may be further configured to: identify a user input for selecting a viewing content among the at least one content; obtain a wavelength distribution of the viewing content based on the information about the color ratio of the viewing content; and change the first RGB output setting of the display based on the wavelength distribution of the viewing content.

According to an aspect of the disclosure, a method for operating an electronic device may include: obtaining first pattern information including information about a state of a first user for a plurality of time intervals; identifying the state of the first user for a current time interval based on the first pattern information; identifying a first wavelength distribution corresponding to the state of the first user based on spectrum information stored in a memory; determining a first RGB output setting of a display according to the first wavelength distribution; generating first correction information based on a user input for screen setting correction and the first RGB output setting; and controlling the display based on the first RGB output setting and the first correction information, where the first correction information includes information about at least one of an RGB correction value, a brightness adjustment value, and a color temperature adjustment value of the display according to the first RGB output setting.

The state of the first user may be any one of a first state of preparing to sleep, a second state of waking up from sleep, and a third state of working or studying.

The method may further include: determining a first time interval and a second time interval among the plurality of time intervals corresponding to the first state and the second state, respectively, based on sleep monitoring information obtained by a sensor; determining a third time interval among the plurality of time intervals corresponding to the third state based on a type of an application executed in the electronic device; and generating pattern information about the respective states corresponding to the first time interval, the second time interval, and the third time interval.

The method may further include identifying an interval in which the first user is in a sleeping state based on the sleep monitoring information, where the first time interval is a predetermined time ahead of the interval in which the first user is in the sleeping state, and the second time interval is a predetermined time after the interval in which the first user is in the sleeping state.

The method may further include: obtaining second pattern information about a state of a second user for each of the plurality of time intervals; identifying the state of the second user for a current time interval based on the second pattern information; identifying a second wavelength distribution corresponding to the state of the second user based on spectrum information stored in the memory; determining a second RGB output setting of the display according to the second wavelength distribution; and generating second correction information for the display based on a second RGB output setting.

BRIEF DESCRIPTION OF DRAWINGS

The above and other aspects, features, and advantages of certain embodiments of the present disclosure will be more apparent from the following description taken in conjunction with the accompanying drawings, in which.

In connection with the description of the drawings, the same or similar reference numerals may be used to denote the same or similar elements.

DETAILED DESCRIPTION

Figure 1:
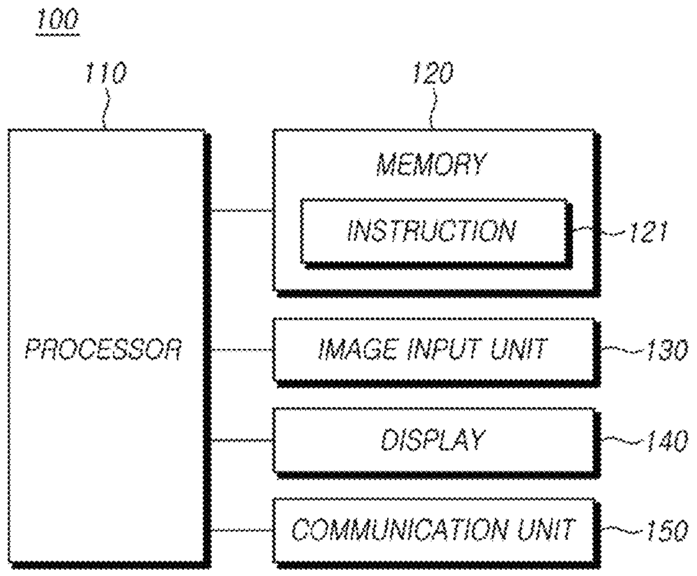
FIG. 1 is a block diagram illustrating a configuration of an electronic device according to an embodiment.

Hereinafter, embodiments of the disclosure are described in detail with reference to the drawings so that those skilled in the art to which the disclosure pertains may easily practice the disclosure. However, the disclosure may be implemented in other various forms and is not limited to the embodiments set forth herein. The same or similar reference denotations may be used to refer to the same or similar elements throughout the specification and the drawings. Further, for clarity and brevity, no description is made of well-known functions and configurations in the drawings and relevant descriptions.

FIG. 1 is a block diagram illustrating a configuration of an electronic device according to an embodiment; The electronic device of FIG. 1 may be, but is not limited to, a smartphone, a tablet PC, a PC, a smart TV, a mobile phone, a personal digital assistant (PDA), a laptop computer, a media player, a micro server, a digital broadcast terminal, a navigation, a kiosk, a home appliance, or other mobile or non-mobile computing devices. The electronic device 100 may be wearable terminals, such as watches and glasses, capable of performing various computing functions, such as real-time video watching, chatting, and communication. The electronic device 100 may be various types of terminals without being limited to the above examples. Below described is a method for determining whether an image received through a broadcaster is an advertisement by analyzing it using image matching and character recognition based on machine learning.

According to an embodiment, the memory 120 is a storage medium used by the electronic device 100 and may store data, such as at least one instruction 121 or configuration information corresponding to at least one program. The program may include an operating system (OS) program and various application programs.

In an embodiment, the memory 120 may store a learning model (e.g., a machine learning model for image matching or a machine learning model for character recognition)

based on one or more neural networks for recognizing a logo image or text from an image.

In an embodiment, the storage unit 120 may include at least one type of storage medium of flash memory types, hard disk types, multimedia card micro types, card types of memories (e.g., SD or XD memory cards), random access memories (RAMs), static random access memories (SRAMs), read-only memories (ROMs), electrically erasable programmable read-only memories (EEPROMs), programmable read-only memories (PROMs), magnetic memories, magnetic disks, or optical discs.

According to an embodiment, the image input unit 130 may receive real-time viewing images and real-time viewing image information through a tuner, an input/output unit, or the communication unit 150. The real-time viewing image information may include image metadata including, e.g., identification information, genre information, cast information, and character information about the real-time image. To that end, the image input unit 130 may include at least one of the tuner and the input/output unit. The tuner may tune and select only the frequency of the broadcast channel to be received by the electronic device 100 among many radio components, by amplifying, mixing, and resonating the broadcast signals wiredly/wirelessly received. The broadcast signal may include video, audio, and additional data (e.g., electronic program guide (EPG)). The tuner may receive real-time broadcast channels (or real-time viewing images) from various broadcast sources, such as terrestrial broadcasts, cable broadcasts, satellite broadcasts, Internet broadcasts, and the like. The tuner may be implemented integrally with the electronic device 100 or may be implemented as a separate tuner electrically connected to the electronic device 100. The input/output unit may include at least one of a high definition multimedia interface (HDMI) input port, a component input jack, a PC input port, and a USB input jack capable of receiving a real-time viewing image and real-time viewing image information from an external device of the electronic device 100 under the control of the processor 110. It is obvious to one of ordinary skill in the art that the input/output unit may be added, deleted, and/or changed according to the performance and structure of the electronic device 100.

According to an embodiment, the display 140 may perform functions for outputting information in the form of numbers, characters, images, and/or graphics. The display 140 may include at least one hardware module for output. The at least one hardware module may include at least one of, e.g., a liquid crystal display (LCD), a light emitting diode (LED), a light emitting polymer display (LPD), an organic light emitting diode (OLED), an active matrix organic light emitting diode (AMOLED), or flexible LED (FLED). The display 140 may display a screen corresponding to data received from the processor 110. The display 140 may be referred to as an 'output unit', a 'display unit', or by other terms having an equivalent technical meaning.

According to an embodiment, the communication unit 150 may provide a wired/wireless communication interface enabling communication with an external device. The communication unit 150 may include at least one of a wired Ethernet, a wireless LAN communication unit, and a short-range communication unit. The wireless LAN communication unit may include, e.g., Wi-Fi, and may support the wireless LAN standard (IEEE802.11x) of the institute of electrical and electronics engineers (IEEE). The wireless LAN communication unit may be wirelessly connected to an access point (AP) under the control of the processor 110. The short-range communication unit may perform short-range communication wirelessly with an external device under the control of the processor 110. Short-range communication may include Bluetooth, Bluetooth low energy, infrared data association (IrDA), ultra-wideband (UWB), and near-field communication (NFC). The external device may include a server device and a mobile terminal (e.g., phone, tablet, etc.) providing, e.g., an image or chatting service.

According to an embodiment, the processor 110 may control at least one other component of the electronic device 100 and/or execute computation or data processing regarding communication by executing at least one instruction 121 stored in the memory 120. The processor 110 may include at least one of a central processing unit (CPU), a graphic processing unit (GPU), a micro controller unit (MCU), a sensor hub, a supplementary processor, a communication processor, an application processor, an application specific integrated circuit (ASIC), or field programmable gate arrays (FPGA) and may have multiple cores.

According to an embodiment, the processor 110 may control the overall operation of the electronic device 100. For example, the processor 110 may control the overall operation of the electronic device 100 by executing programs stored in the memory 120. Further, the processor 110 may perform a function of the electronic device 100 for recognizing an advertisement section in an image by executing programs stored in the memory 120. The processor 110 may process the broadcast image displayed by the electronic device 100 by executing at least one instruction stored in the memory 120. The processor 110 may include one or more processors (e.g., GPU, NPU, and CPU).

In an embodiment, the processor 110 may perform an operation for determining whether the image displayed by the electronic device 100 is an advertisement image.

In an embodiment, the processor 110 may obtain image data transmitted from a broadcaster through the image input unit 130. For example, the processor 110 may obtain content data from an external image device, a cable device, a set-top box, a server, and another mobile phone terminal (e.g., mirroring) through the image input unit 130.

The processor 110 according to an embodiment may include a state determination unit 210, a spectrum determination unit 220, a spectrum output unit 230, and a content recommendation unit 240. The operation of the processor 110 is described below in detail with reference to FIG. 2.

Figure 2:
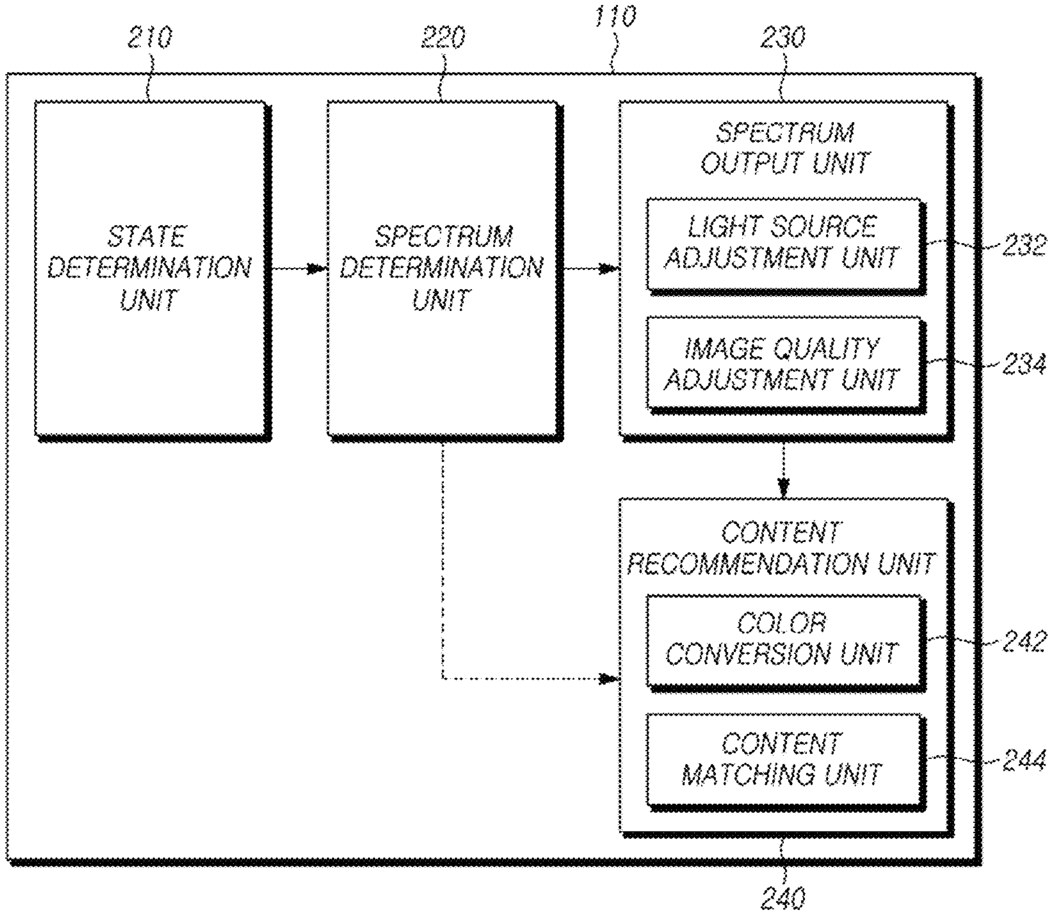
FIG. 2 is a block diagram illustrating an electronic device according to an embodiment.

FIG. 2 is a block diagram illustrating a configuration of a processor according to an embodiment. The processor 110 of FIG. 2 represents the processor 110 of FIG. 1. The block configuration of the processor illustrated in FIG. 2 illustrates at least some components, and other components for performing the function of the electronic device may be included.

Referring to FIG. 2, the processor 110 according to an embodiment may include a state determination unit 210, a spectrum determination unit 220, a spectrum output unit 230, and a content recommendation unit 240.

In an embodiment, the state determination unit 210 may determine the state of the user of the electronic device 100 by analyzing the use data of the electronic device 100.

In an embodiment, the use data of the electronic device may include the use time of the electronic device, the type of content viewed by the user through the electronic device, the type or title of the application executed by the user through the electronic device, sleep monitoring service data, or the like.

In an embodiment, the state of the user of the electronic device may include a state before sleep, a state of waking up and preparing to go to work, a state of studying and working, a state of resting, or the like.

In an embodiment, the spectrum determination unit 220 may determine an optimal spectrum combination to be displayed on the display 140 of the electronic device 100 according to the state determined by the state determination unit 210. The spectrum combination may mean a wavelength distribution. For example, the spectrum combination may mean a distribution based on the length of the wavelength and the intensity of the corresponding wavelength.

In an embodiment, the spectrum combination determined by the spectrum determination unit 220 may include any one of predefined spectrum combinations.

In an embodiment, the spectrum output unit 230 may adjust the light source and the image quality to implement the optimal spectrum combination determined by the spectrum determination unit 220. In an embodiment, the spectrum output unit 230 may include a light source adjustment unit 232 and an image quality adjustment unit 234.

In an embodiment, the light source adjustment unit 232 may control the display panel constituting the display (e.g., the display 140) based on the determined optimal spectrum combination. For example, when the display is a light emitting diode (LED), power output for each light source of the LED may be controlled.

In an embodiment, as the light source adjustment unit 232 adjusts the output of each light source, the image quality adjustment unit 234 may correct the settings of the screen to minimize a change in image quality that may occur because the output of a specific light source increases. For example, as the output of a specific light source increases, the reproduced color space may decrease, or a specific color space may be added. In order to minimize such a change, the image quality adjustment unit 234 may correct image quality settings such as color, brightness, color temperature, and white balance so as not to deviate from the image quality standard of the display.

In an embodiment, the content recommendation unit 240 may display at least one content expressible through the determined optimal spectrum combination to the user. In an embodiment, the content recommendation unit 240 may include a color conversion unit 242 and a content matching unit 244.

In an embodiment, the color conversion unit 242 may convert information about the spectrum combination output from the spectrum output unit 230 into color information. The spectrum output unit 230 may extract color space information that the electronic device may best express in the current state, based on the converted color information.

In an embodiment, the content matching unit 244 may analyze data about a plurality of contents stored in the memory (e.g., the memory 120) or data about a plurality of contents received or input through a communication unit (e.g., the communication unit 150) and an image input unit (e.g., the image input unit 130), and may identify at least one content having a ratio that matches the color space information extracted from the color conversion unit which is a predetermined ratio or more. The content matching unit 244 may display a list including the identified at least one content on a screen to display the at least one content as content recommended in the current state, thereby leading the user to select the content.

Electronic devices including a display provide the functions of reducing the user's eye fatigue and blocking blue light that may interfere with sleep. The method of reducing the brightness of the electronic device and the wavelength emitting blue light is merely an indirect method, and does not control the distribution of the output wavelength so as to directly affect the user's biological rhythm.

An electronic device according to an embodiment may determine the optimized spectrum combination based on the user's state (e.g., the characteristic of the content being viewed, the type of the application being executed, the time period during which the electronic device is used, etc.) or the user's life pattern (e.g., sleeping, waking up, going to work, working or learning, resting, etc.) inferred based on the user's device use pattern of the electronic device.

Further, the electronic device according to an embodiment may adjust the screen settings to compensate for the limitation of the color space that may occur in outputting the screen through the determined optimal spectrum combination, and thus may recommend content expressible in the color space expressed by each spectrum.

Figure 3:
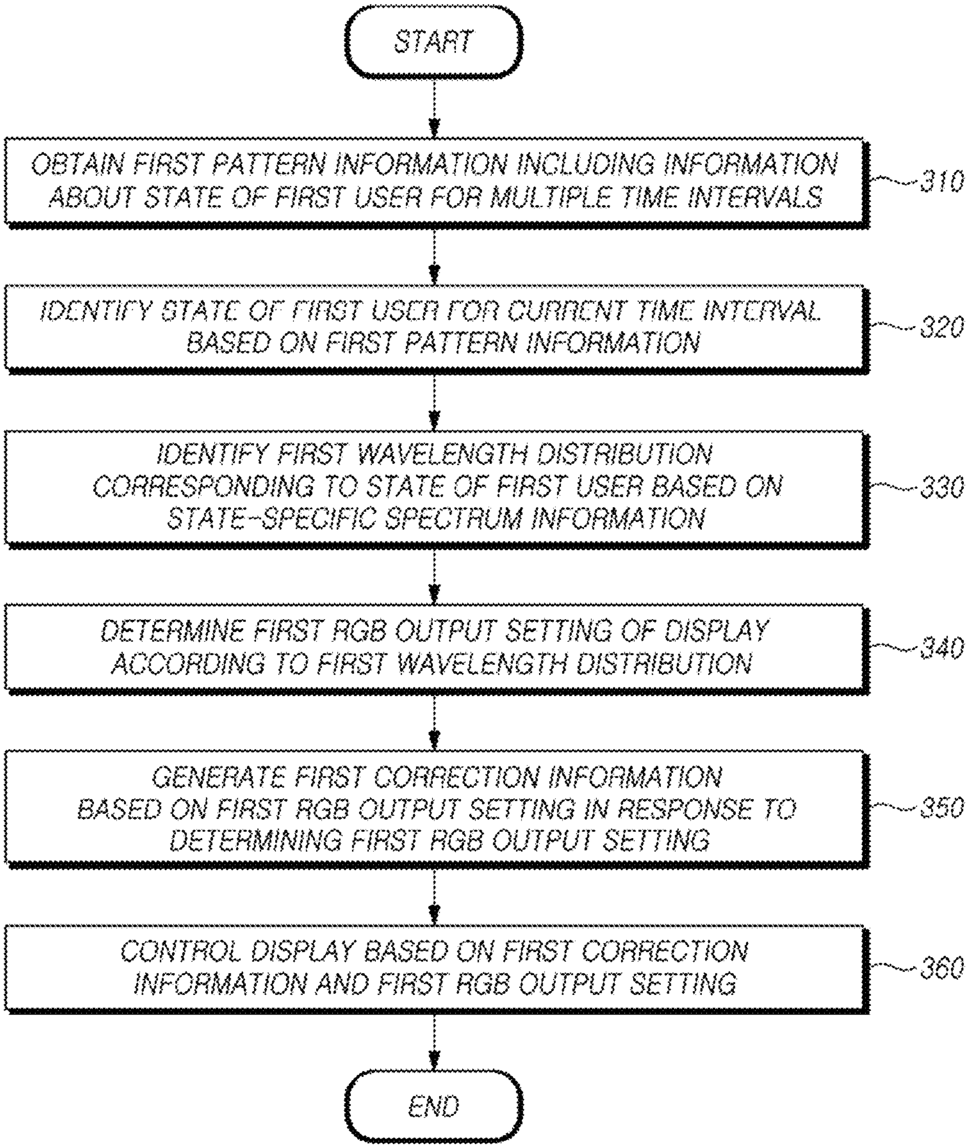
FIG. 3 illustrates an operation flow of an electronic device according to an embodiment.
Figure 4:
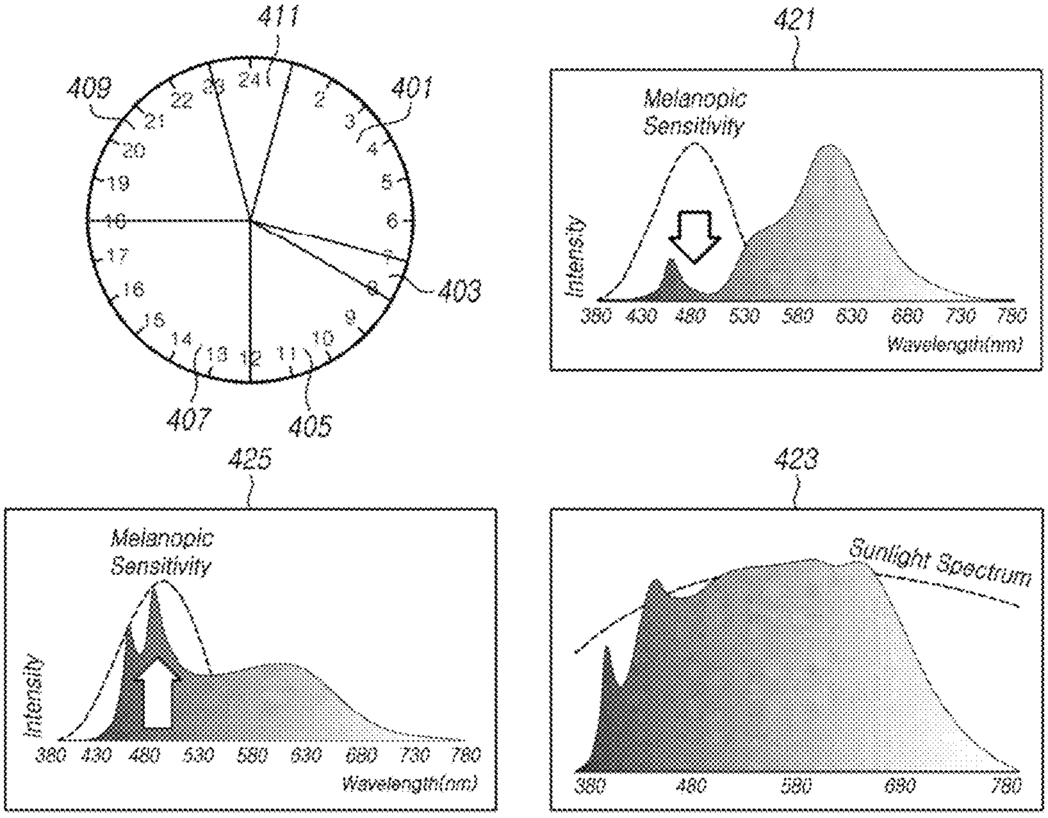
FIG. 4 illustrates an example of a wavelength distribution for each status of a user according to an embodiment.

FIG. 3 illustrates an operation flow of an electronic device according to an embodiment. FIG. 4 illustrates an example of a wavelength distribution for each status of a user according to an embodiment. The electronic device of FIGS. 3 and 4 may include an electronic device 100. Among the terms described with reference to FIGS. 3 and 4, those overlapping what has been described with reference to FIGS. 1 and 2 may be omitted. In addition to the operations of FIG. 3, other operations involved in the operation of the electronic device may be added, and some operations of FIG. 3 may be omitted.

According to an embodiment, in operation 310, the electronic device may obtain first pattern information including information about the state of a first user for a plurality of time intervals.

In an embodiment, the plurality of time intervals may refer to time intervals of a predetermined length determined with respect to a day (e.g., 24 hours). For example, referring to FIG. 4, the plurality of time intervals may include a first time interval 401 (e.g., 01:00 to 07:00), a second time interval 403 (e.g., 07:00 to 08:00), a third time interval 405 (e.g., 08:00 to 12:00), a fourth time interval 407 (e.g., 12:00 to 18:00), a fifth time interval 409 (e.g., 18:00 to 23:00), and a sixth time interval 411 (e.g., 23:00 to 01:00). The plurality of time intervals illustrated in FIG. 4 are merely an example, and various time intervals may be set. In other words, there may be less or more time intervals than 6, and the time of each time interval may also be determined differently.

In an embodiment, the user's states may include a state before sleep, a state of waking up and preparing to go to work, a state of studying and working, a state of resting, or the like.

In an embodiment, the pattern information may be obtained based on information about the state of the user in a specific time interval. For example, referring to FIG. 4, in relation to the first user, the user is in the sleeping state in the first time interval 401, in the state of preparing to go to work in the second time interval 403, in the state of working in the third time interval 405 and the fourth time interval 407, in the state of resting in the fifth time interval 409, and in the state of preparing to sleep in the sixth time interval 411, and first pattern information about the first user may be obtained based on information indicating the state of the first user for each time interval.

In an embodiment, the electronic device may determine the state of the user in a specific time interval based on the use data or sensing information about the electronic device. For example, the use data of the electronic device may include the use time of the electronic device, the type of content viewed by the user through the electronic device, the type or title of the application executed by the user through the electronic device, sleep monitoring service data, or the like.

In an embodiment, the sensing information may include user information (e.g., pulse rate, movement information, location information, ambient noise information, etc.) sensed by an external electronic device (e.g., a smart phone, a wearable device (e.g., a smart watch, a wireless earphone, a smart ring, etc.)). For example, when the pulse rate of the user obtained through the external electronic device matches the pulse rate that appears during sleep, the electronic device may determine that the user is in the sleeping state based on the sensing information. For example, when the ambient noise information about the user obtained through the external electronic device is maintained at a predetermined level or more, the electronic device may determine that the user is in the state of going to work.

In an embodiment, the state of the user of the electronic device may include a state before sleep, a state of waking up and preparing to go to work, a state of studying and working, a state of resting, or the like.

In an embodiment, the electronic device may identify the time interval in which the user is sleeping, based on the sleep monitoring data.

In an embodiment, the electronic device may determine a time interval which is a predetermined time ahead of the identified time interval of sleeping as the state of preparing to sleep.

In an embodiment, the electronic device determines a time interval, which is a predetermined time after the identified time interval of sleeping, as the state of waking up and preparing to go to work.

In an embodiment, the pattern information may be generated differently for each user. For example, when obtaining pattern information, the electronic device may identify the subject who uses the use data input to the electronic device. The electronic device may generate pattern information based on the identified use subject. For example, pattern information having different states in the same time period may be generated for each use subject. The electronic device may identify state information for each user based on time/space information and TV use data identified for each user of the electronic device. As is described below, a screen may be output through a different wavelength distribution for the use subject having different pattern information. For example, pattern information output in the same time period may vary for each electronic device or each user account identified by the electronic device.

The electronic device may not only determine the state of the user through the use history or sensing information, but also identify individual life cycles by referring to the time and context of the user, such as sleep, wake-up, study (work), going out, watching TV, and the like. Therefore, for users having different biometric cycles at night and day, the electronic device may output a spectrum suitable for sleep even during the daytime by referring to the life cycle of each user, and may output a spectrum necessary for awakening even at night.

According to an embodiment, in operation 320, the electronic device may identify the state of the first user for the current time interval, based on the first pattern information. For example, referring to FIG. 4, when the current time is 07:30, the electronic device may determine the state of the first user as the state of preparing to go to work.

In an embodiment, when the electronic device obtains sensing information different from the first pattern information, the electronic device may identify the state of the first user based on the different sensing information. For example, according to the first pattern information, when the first user is in the state of preparing to go to work at 07:30, but the state of the user obtained through the sensing information is the sleeping state, the electronic device may identify the state of the first user as the sleeping state.

According to an embodiment, in operation 330, the electronic device may identify a first wavelength distribution corresponding to the state of the first user, based on the state-specific spectrum information.

In an embodiment, the state-specific spectrum information may mean information about a wavelength distribution defined for each state.

In an embodiment, when the user is in the state of waking up or preparing to go to work, the electronic device may identify the wavelength distribution 423. For example, the optimum spectrum of the second time interval 403 may be identified through the wavelength distribution 423. Since the user wakes up from bed, it may be identified that the optimal spectrum combination is not concentrated in a specific wavelength range, but is distributed throughout.

In an embodiment, when the user's state is the state of studying or working, the electronic device may identify the wavelength distribution 425. For example, the optimum spectrum in the third time interval 405 and the fourth time interval 407 may be identified through the wavelength distribution 425. When the user is studying and working, it is preferable that the output of the blue light is strong to help the user wake up, and thus a distribution having a strong wavelength in a range corresponding to the blue light may be determined as an optimal spectrum combination.

In an embodiment, when the user's state is the state of preparing to sleep, the electronic device may identify the wavelength distribution 421. For example, the optimum spectrum of the sixth time interval 411 may be identified through the wavelength distribution 421. When the user is in the state of preparing to sleep, in this case, it is not preferable to be excessively exposed to blue light, and thus the wavelength distribution 421 having a wavelength combination that reduces the output of blue light and a specific wavelength and increases the color temperature of red light may be determined as an optimal spectral combination.

In an embodiment, different wavelength distributions may be identified for different users. For example, even in the same time interval, when the users are different as the first user and the second user, the electronic device may identify different wavelength distributions. This is because the wavelength distribution according to an embodiment is identified based on the pattern information for each user identified based on the time/space information and the TV use data in operation 310. Accordingly, the spectrum of the wavelength output through the screen may vary even if it is the same time interval for each device or according to the user's account.

As described above, a different wavelength distribution may be defined for each state, and state-specific spectrum information may mean information about such state-specific wavelength distributions.

According to an embodiment, in operation 340, the electronic device may determine a first RGB output settings of the display according to the first wavelength distribution.

In an embodiment, the electronic device may adjust the power output for each light source of the display according to the first wavelength distribution. For example, when the first wavelength distribution is the wavelength distribution 421, the output of blue light may be reduced and the output of red light may be strengthened.

In an embodiment, to implement the spectrum according to the first wavelength distribution identified in operation 330, the LED power output unit may be controlled.

According to an embodiment, in operation 350, the electronic device may generate first correction information based on the first RGB output setting, in response to determining the first RGB output setting. In an embodiment, when the electronic device controls the LED power output unit according to the first wavelength distribution identified in operation 330, the target color space (e.g., DCI color volume 100%) of the TV may not be met. In order to address the issue with the color space that may occur during the implementation process, it is possible to minimize the viewer's inconvenience of the viewing image quality by adjusting the image quality such as color temperature, white balance, etc.

In an embodiment, the electronic device may adjust at least one of color, brightness, color temperature, and white balance by determining the first RGB output setting. As the electronic device determines the RGB output setting according to the specific wavelength distribution in operation 340, when the output (e.g., red light) of a specific light source is large and the output (e.g., blue light) of another light source is small, the represented color space may be reduced or a specific color space may be added. To prevent this, the electronic device may adjust color, brightness, color temperature, white balance, and the like.

In an embodiment, the correction information may include information about a screen setting that is corrected as the electronic device determines the first RGB output setting. For example, the correction information may include information about color, brightness, color temperature, or white balance that the electronic device adjusts as the electronic device determines the first RGB output setting. For example, when the first wavelength distribution is the wavelength distribution 425, the electronic device may increase the output of blue light in determining the first RGB setting. In this case, the implementation ranges of the red area and the green area may be reduced, resulting in a change in the color space. In this case, the electronic device may perform correction to reduce blue light by adjusting the white balance. Correction information including information about such adjustment may be generated.

In an embodiment, the correction information may be previously generated and stored together with the wavelength distribution included in the pattern information.

According to an embodiment, in operation 360, the electronic device may control the display based on the first RGB output setting and the first correction information. For example, the electronic device may determine the first RGB output setting according to the wavelength distribution 421 in the sixth interval 411, and may generate correction information according to the determination of the first RGB output setting. By displaying a screen based on the first RGB output setting and the first correction information, the electronic device may output the wavelength where the user's biological rhythm of the electronic device is enhanced, and thereby enhance the degradation of image quality.

Figure 5:
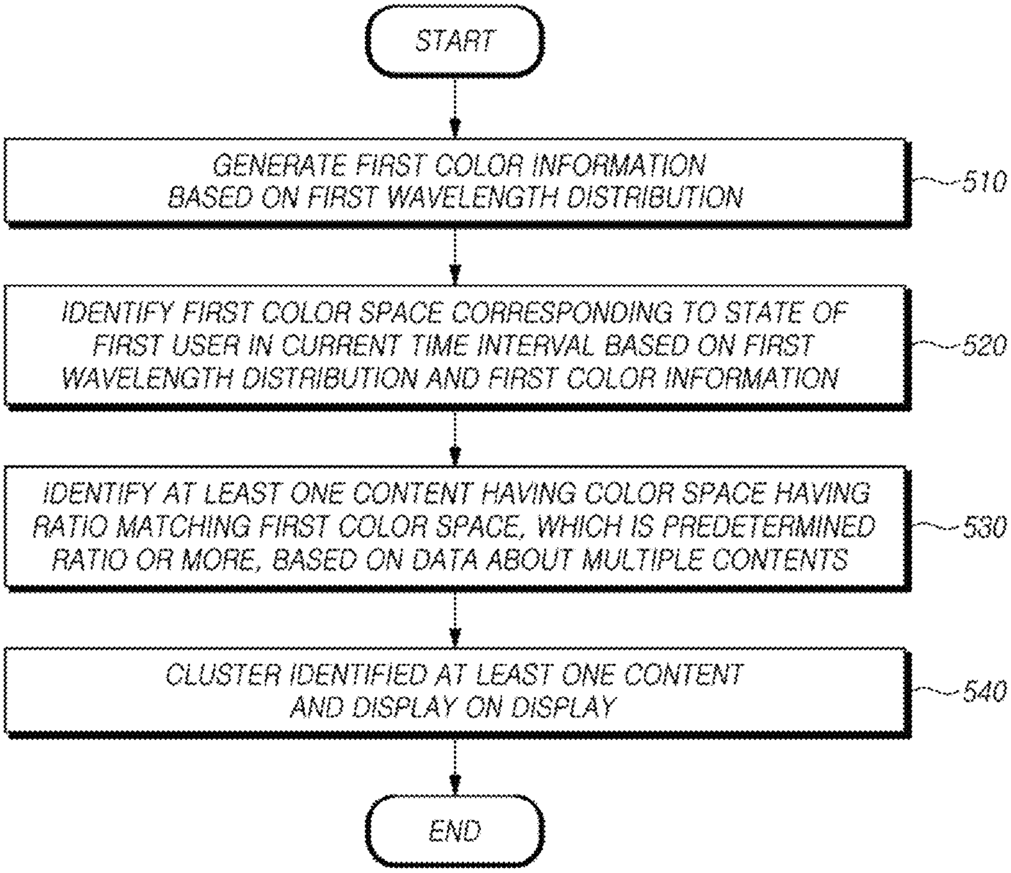
FIG. 5 illustrates an operation flow of an electronic device according to an embodiment.
Figure 6:
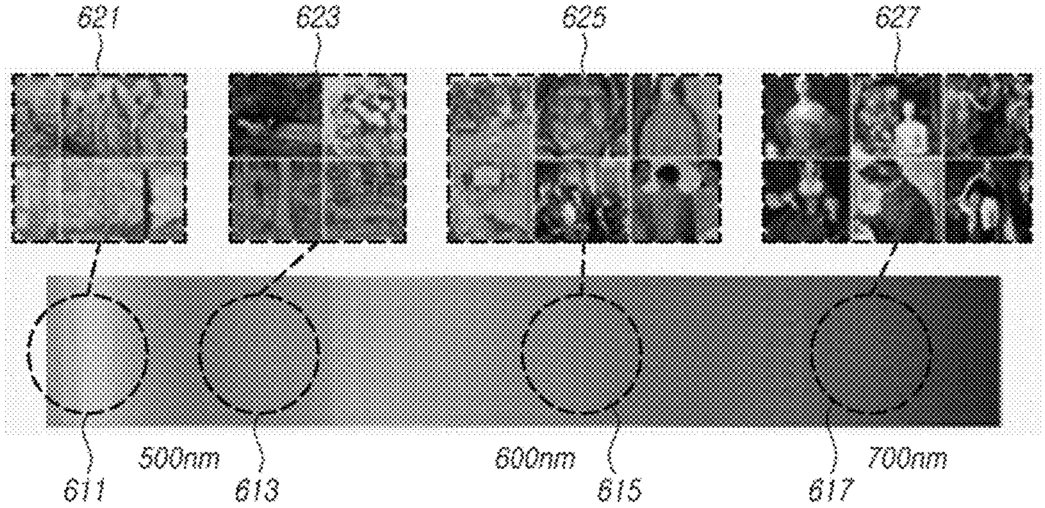
FIG. 6 illustrates an example of a wavelength distribution for each content displayed on an electronic device according to an embodiment.

FIG. 5 illustrates an operation flow of an electronic device according to an embodiment. FIG. 6 illustrates an example of a wavelength distribution for each content displayed on an electronic device according to an embodiment. The operation flow of the electronic device of FIG. 5 illustrates an operation flow for recommending suitable content according to an optimal spectrum determined by the electronic device. The electronic device of FIG. 5 may include the electronic device 100 of FIG. 1. In the following description, the description of those described above in the drawings may be omitted.

According to an embodiment, in operation 510, the electronic device may generate first color information based on the first wavelength distribution. In an embodiment, the electronic device may generate first color information based on the first wavelength distribution identified in operation 330 of FIG. 4. In an embodiment, the color information may include color information predefined according to a wavelength distribution (e.g., the wavelength distribution 421, the wavelength distribution 423, and the wavelength distribution 425).

In an embodiment, the electronic device may convert the first wavelength distribution into the first color information using a machine learning model for conversion of wavelength and color.

In an embodiment, the color information may include information about a ratio for each color included in the corresponding wavelength distribution. For example, the electronic device may generate the color information shown in Table 2 based on the wavelength distribution shown in Table 1 below.

TABLE 1

| Wavelength (nm) | Ratio |
|---|---|
| 380 | 0 |
| 430 | 10 |
| . . . | . . . |
| 780 | 27 |

TABLE 2

| Color | Ratio |
|---|---|
| #d9e43d | 0 |
| #e8234h | 10 |
| . . . | . . . |
| #d3dfj3d | 27 |

According to an embodiment, in operation 520, the electronic device may identify a first color space corresponding to the state of the first user in the current time interval, based on the first wavelength distribution and the first color information. The first color space may include information about a range of colors that may be expressed on the display of the electronic device according to the color information generated in operation 510. For example, the color space may include information indicating how much color expression is possible as a percentage based on color standards such as sRGB, Adobe RGB, and DCI-P3 expressed in the CIE color coordinate system. In an embodiment, the electronic device may determine a preferred color space and a non-preferred color space based on the identified first color space or first color information. For example, in the case of a color in which the ratio to the color information is equal to or less than a predetermined value, the electronic device may determine it as a non-preferred band. For example, in the case of a color in which the ratio to the color information is the predetermined value or more, the electronic device may determine it as a preferred band. For example, the electronic device may determine 440-480 nm (color: blue/cyan) as a preferred color space based on the wavelength distribution 425.

In an embodiment, the electronic device may determine a specific wavelength band (e.g., a wavelength helpful for awakening in the state of studying/working) that is helpful when output in the identified state (e.g., the state identified in operation 320) as the preferred band to project the specific wavelength onto the user's retina. In an embodiment, when outputting a screen according to an output setting, the electronic device may determine a color space corresponding to a color that is not represented on the screen as a non-preferred band.

According to an embodiment, in operation 530, the electronic device may identify at least one content having a color space in which a ratio matching the first color space is larger than or equal to a predetermined ratio, based on data about the plurality of contents.

In an embodiment, the data about the plurality of contents may include data stored in the memory.

In an embodiment, the data about the plurality of contents may include data received from an external device and obtained.

In an embodiment, the data about the plurality of contents may include color information included in the content. For example, the data about the plurality of contents may include information about a color ratio included in each content. For example, the data about the plurality of contents may include information about content that may be displayed according to the wavelength distribution.

In an embodiment, the electronic device may generate color information based on data about the plurality of contents. When the data about the content does not include information about the color ratio of the content, the electronic device may extract the color ratio based on the data about the content.

In an embodiment, the electronic device may identify content including the preferred band by a predetermined ratio or more as at least one content.

In an embodiment, the electronic device may not identify the content including the non-preferred band by a predetermined ratio or more as at least one content.

According to an embodiment, in operation 540, the electronic device may cluster and display the identified at least one content on the display.

Referring to FIG. 6, in an embodiment, when the preferred band is determined as the wavelength range 611, the electronic device may cluster the plurality of contents 621 and display the same on the display. In an embodiment, when the preferred band is determined as the wavelength range 613, the electronic device may cluster the plurality of contents 623 and display the same on the display. In an embodiment, when the preferred band is determined as the wavelength range 615, the electronic device may cluster and display the plurality of contents 625. In an embodiment, when the preferred band is determined as the wavelength range 617, the electronic device may cluster and display the plurality of contents 627.

In an embodiment, the electronic device may display a list of the identified at least one content on the display.

In an embodiment, the electronic device may display a user interface including an object for receiving a user input for reproducing the identified at least one content.

In an embodiment, the electronic device may display at least one identified content. For example, when there is one content (e.g., an image of a natural landscape) recommended to a specific user in the second time interval (e.g., the second time interval 403), the electronic device may display the identified content without a separate user input or selection.

In an embodiment, the electronic device may identify the wavelength distribution of the content based on the color information about the content. Accordingly, the electronic device may correct the screen setting based on the identified wavelength distribution and output the corresponding wavelength to help richer color expression and to express image quality that does not interfere with viewing image quality.

An electronic device according to an embodiment of the disclosure may comprise a display, a memory, and at least one processor operably connected to the memory. The at least one processor may obtain first pattern information including information about a state of a first user for a plurality of time intervals, identify the state of the first user for a current time interval based on the first pattern information, identify a first wavelength distribution corresponding to the state of the first user based on state-specific spectrum information stored in the memory, determine a first RGB output setting of the display according to the first wavelength distribution, generate first correction information based on a user input for screen setting correction and the first RGB output setting in response to determining the first RGB output setting, and control the display based on the first RGB output setting and the first correction information. The first correction information may include information about at least one of an RGB correction value, a brightness adjustment value, and a color temperature adjustment value of the display according to the first RGB output setting.

In an embodiment, the state may be any one of a first state indicating a state of preparing to sleep, a second state indicating a state of waking up from sleep, and a third state indicating a state of viewing content for working or studying.

In an embodiment, the at least one processor may determine states of a first time interval and a second time interval among the plurality of time intervals as a first state and a second state, respectively, based on sleep monitoring information received from a sensor unit of the electronic device or an external electronic device connected to the electronic device, determine a state of a third time interval among the plurality of time intervals as a third state based on a type of an application executed in the electronic device, and generate the pattern information including information about the respective states of the first time interval, the second time interval, and the third time interval.

In an embodiment, the at least one processor may identify an interval where the first user is in a sleeping state based on the sleep monitoring information. The first time interval may include an interval which is a predetermined time ahead of the interval where the first user is in the sleeping state, and the second time interval may include an interval, a predetermined time after the interval where the first user is in the sleeping state.

In an embodiment, the at least one processor may obtain second pattern information including information about a state of a second user for each of the plurality of time intervals, identify the state of the second user for a current time interval based on the second pattern information, identify a second wavelength distribution corresponding to the state of the second user based on state-specific spectrum information stored in the memory, determine a second RGB output setting of the display according to the second wavelength distribution, and generate second correction information for the display based on a second RGB output setting in response to determining the second RGB output setting.

In an embodiment, the at least one processor may determine whether the user of the electronic device is the first user or the second user.

In an embodiment, the at least one processor may generate first color information based on the first wavelength distribution, identify a first color space corresponding to the state of the first user in the current time interval based on the first wavelength distribution and the first color information, identify at least one content having a color space having a ratio matching the first color space, which is a predetermined ratio or more, based on data about a plurality of contents stored in the memory, and cluster the identified at least one content and display on the display.

In an embodiment, the at least one processor may identify a preferred area and a non-preferred area in the color space, for the state of the first user in the current time interval, and include the preferred area by a first ratio or more and includes the non-preferred area to be smaller than a second ratio.

In an embodiment, the electronic device may further comprise an image input unit. The at least one processor may obtain data about the plurality of contents through the image input unit, generate information about a color ratio for each of the plurality of contents based on the data about the plurality of contents, and identify the at least one content based on the information about the color ratio.

In an embodiment, the at least one processor may identify a user input for selecting a viewing content among the at least one content, obtain a wavelength distribution of the viewing content based on the information about the color ratio of the viewing content, and change the first RGB output setting of the display based on the wavelength distribution of the viewing content.

A method for operating an electronic device, according to an embodiment of the disclosure, may comprise obtaining first pattern information including information about a state of a first user for a plurality of time intervals, identifying the state of the first user for a current time interval based on the first pattern information, identifying a first wavelength distribution corresponding to the state of the first user based on state-specific spectrum information stored in a memory, determining a first RGB output setting of a display according to the first wavelength distribution, generating first correction information based on a user input for screen setting correction and the first RGB output setting in response to determining the first RGB output setting, and controlling the display based on the first RGB output setting and the first correction information. The first correction information may include information about at least one of an RGB correction value, a brightness adjustment value, and a color temperature adjustment value of the display according to the first RGB output setting.

In an embodiment, in the method for operating the electronic device, the state may be any one of a first state indicating a state of preparing to sleep, a second state indicating a state of waking up from sleep, and a third state indicating a state of viewing content for working or studying.

In an embodiment, the method for operating the electronic device may further comprise determining states of a first time interval and a second time interval among the plurality of time intervals as a first state and a second state, respectively, based on sleep monitoring information received from a sensor unit of the electronic device or an external electronic device connected to the electronic device, determining a state of a third time interval among the plurality of time intervals as a third state based on a type of an application executed in the electronic device, and generating the pattern information including information about the respective states of the first time interval, the second time interval, and the third time interval.

In an embodiment, the method for operating the electronic device may further comprise identifying an interval where the first user is in a sleeping state based on the sleep monitoring information. The first time interval may include an interval which is a predetermined time ahead of the interval where the first user is in the sleeping state, and the second time interval may include an interval, a predetermined time after the interval where the first user is in the sleeping state.

In an embodiment, the method for operating the electronic device may further comprise obtaining second pattern information including information about a state of a second user for each of the plurality of time intervals, identifying the state of the second user for a current time interval based on the second pattern information, identifying a second wavelength distribution corresponding to the state of the second user based on state-specific spectrum information stored in the memory, determining a second RGB output setting of the display according to the second wavelength distribution, and generating second correction information for the display based on a second RGB output setting in response to determining the second RGB output setting.

In an embodiment, the method for operating the electronic device may further comprise determining whether the user of the electronic device is the first user or the second user.

In an embodiment, the method for operating the electronic device may further comprise generating first color information based on the first wavelength distribution, identifying a first color space corresponding to the state of the first user in the current time interval based on the first wavelength distribution and the first color information, identifying at least one content having a color space having a ratio matching the first color space, which is a predetermined ratio or more, based on data about a plurality of contents stored in the memory, and clustering the identified at least one content and displaying on the display.

In an embodiment, the method for operating the electronic device may further comprise identifying a preferred area and a non-preferred area in the color space, for the state of the first user in the current time interval, and including the preferred area by a first ratio or more and includes the non-preferred area to be smaller than a second ratio.

In an embodiment, the method for operating the electronic device may further comprise obtaining data about the plurality of contents, generating information about a color ratio for each of the plurality of contents based on the data about the plurality of contents, and identifying the at least one content based on the information about the color ratio.

In an embodiment, the method for operating the electronic device may further comprise identifying a user input for selecting a viewing content among the at least one content, obtaining a wavelength distribution of the viewing content based on the information about the color ratio of the viewing content, and changing the first RGB output setting of the display based on the wavelength distribution of the viewing content.

The electronic device according to various embodiments of the disclosure may be one of various types of electronic devices. The electronic devices may include, for example, a display device, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," "comprise," and the like are used to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device 100 described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device provides an effect of outputting a screen through an optimal spectrum.

Further, there is provided an effect that may adaptively control the output of a screen considering a different biological rhythm for each user of the electronic device.

Also provided is an effect that may lead the user to select optimal content to enhance the biological rhythm.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic device, comprising:

a display;

at least one memory storing pattern information including state-specific spectrum information and correction information, the state-specific spectrum information including a plurality of wavelength distributions corresponding to a plurality of states of a user respectively, and the correction information including information about a screen setting that is to be corrected for each wavelength distribution, wherein the at least one memory comprises a memory storing instructions; and at least one processor operably connected to the at least one memory and configured to execute the instructions, wherein, by executing the instructions, the at least one processor is configured to:

obtain first pattern information including information about a state of a first user for a plurality of time intervals;

identify the state of the first user for a current time interval based on the first pattern information;

identify a first wavelength distribution corresponding to the state of the first user based on the state-specific spectrum information stored in the at least one memory;

determine a first RGB output setting of the display according to the first wavelength distribution;

for a screen setting that is to be corrected according to the first wavelength distribution, generate first correction information based on a user input for screen setting correction and the first RGB output setting; and control the display based on the first RGB output setting and the first correction information, and wherein the first correction information includes, in accordance with the screen setting that is to be corrected, information about at least one of an RGB correction value, a brightness adjustment value, or a color temperature adjustment value of the display according to the first RGB output setting.

2. The electronic device of claim 1, wherein the state of the first user is any one of a first state of preparing to sleep, a second state of waking up from sleep, or a third state of working or studying.

3. The electronic device of claim 2, wherein the at least one processor is further configured to:

determine a first time interval and a second time interval among the plurality of time intervals corresponding to the first state and the second state, respectively, based on sleep monitoring information obtained by a sensor;

determine a third time interval among the plurality of time intervals corresponding to the third state based on a type of an application executed in the electronic device; and generate pattern information about the respective states corresponding to the first time interval, the second time interval, and the third time interval.

4. The electronic device of claim 3, wherein the at least one processor is further configured to identify an interval in which the first user is in a sleeping state based on the sleep monitoring information, and wherein the first time interval is a predetermined time ahead of the interval in which the first user is in the sleeping state, and the second time interval is a predetermined time after the interval in which the first user is in the sleeping state.

5. The electronic device of claim 1, wherein the at least one processor is further configured to:

obtain second pattern information including information about a state of a second user for each of the plurality of time intervals;

identify the state of the second user for a current time interval based on the second pattern information;

identify a second wavelength distribution corresponding to the state of the second user based on spectrum information stored in the at least one memory;

determine a second RGB output setting of the display according to the second wavelength distribution; and generate second correction information for the display based on the second RGB output setting.

6. The electronic device of claim 5, wherein the at least one processor is further configured to determine a user of the electronic device as either the first user or the second user.

7. The electronic device of claim 1, wherein the at least one processor is further configured to:

generate first color information based on the first wavelength distribution;

identify a first color space corresponding to the state of the first user in the current time interval based on the first wavelength distribution and the first color information;

identify at least one content with a color space in which a ratio corresponding to the first color space is a predetermined ratio or more, based on data about a plurality of contents stored in the at least one memory; and cluster the identified at least one content and control the display to display the cluster of the identified at least one content.

8. The electronic device of claim 7, wherein the at least one processor is further configured to:

identify a preferred area and a non-preferred area in the color space for the state of the first user in the current time interval; and identify the at least one content including the preferred area of a first ratio or more and the non-preferred area of a second ratio or smaller.

9. The electronic device of claim 7, further comprising an image input, wherein the at least one processor is further configured to:

obtain data about the plurality of contents through the image input;

generate information about a color ratio for each of the plurality of contents based on the data about the plurality of contents; and identify the at least one content based on the information about the color ratio.

10. The electronic device of claim 9, wherein the at least one processor is further configured to:

identify a user input for selecting a viewing content among the at least one content;

obtain a wavelength distribution of the viewing content based on the information about the color ratio of the viewing content; and change the first RGB output setting of the display based on the wavelength distribution of the viewing content.

11. The electronic device of claim 1, wherein the first pattern information includes information about a state of a first user for at least three time intervals including a first time interval and a second time interval obtained from sleep monitoring information of the first user, and a third time interval, different from the first and second time intervals, obtained from monitoring a use of the electronic device.

12. A method for operating an electronic device, the method comprising:

storing, in at least one memory of the electronic device, pattern information including state-specific spectrum information and correction information, wherein the state-specific spectrum information includes a plurality of wavelength distributions corresponding to a plurality of states of a user respectively, and the correction information includes information about a screen setting that is to be corrected for each wavelength distribution;

obtaining first pattern information including information about a state of a first user for a plurality of time intervals;

identifying the state of the first user for a current time interval based on the first pattern information;

identifying a first wavelength distribution corresponding to the state of the first user based on the state-specific spectrum information;

determining a first RGB output setting of a display according to the first wavelength distribution;

for a screen setting that is to be corrected according to the first wavelength distribution, generating first correction information based on a user input for screen setting correction and the first RGB output setting; and controlling the display based on the first RGB output setting and the first correction information, wherein the first correction information includes, in accordance with the screen setting that is to be corrected, information about at least one of an RGB correction value, a brightness adjustment value, and a color temperature adjustment value of the display according to the first RGB output setting.

13. The method of claim 12, wherein the state is any one of a first state of preparing to sleep, a second state of waking up from sleep, and a third state of working or studying.

14. The method of claim 13, further comprising:

determining a first time interval and a second time interval among the plurality of time intervals corresponding to the first state and the second state, respectively, based on sleep monitoring information obtained by a sensor;

determining a third time interval among the plurality of time intervals corresponding to the third state based on a type of an application executed in the electronic device; and generating pattern information about the respective states corresponding to the first time interval, the second time interval, and the third time interval.

15. The method of claim 14, further comprising identifying an interval in which the first user is in a sleeping state based on the sleep monitoring information, wherein the first time interval is a predetermined time ahead of the interval in which the first user is in the sleeping state, and the second time interval is a predetermined time after the interval in which the first user is in the sleeping state.

16. The method of claim 12, further comprising:

obtaining second pattern information about a state of a second user for each of the plurality of time intervals;

identifying the state of the second user for a current time interval based on the second pattern information;

identifying a second wavelength distribution corresponding to the state of the second user based on spectrum information stored in the memory;

determining a second RGB output setting of the display according to the second wavelength distribution; and generating second correction information for the display based on a second RGB output setting.

* * * * *